United States Patent [19]
Jakubowski et al.

[11] Patent Number: 4,767,538
[45] Date of Patent: Aug. 30, 1988

[54] WASHING OF SEMIPERMEABLE MEMBRANE

[75] Inventors: George M. Jakubowski, Chicago; Susan C. Molthop, Mundelein; Milo Eldridge, Ringwood, all of Ill.

[73] Assignee: Baxter Travenol Laboratories, Inc., Deerfield, Ill.

[21] Appl. No.: 801,529

[22] Filed: Nov. 25, 1985

Related U.S. Application Data

[63] Continuation-in-part of Ser. No. 554,874, Nov. 25, 1983, abandoned, and a continuation-in-part of Ser. No. 458,107, Jan. 14, 1983, abandoned.

[51] Int. Cl.$^4$ ............................................. B01D 13/00
[52] U.S. Cl. ............................... 210/636; 210/500.23; 422/22
[58] Field of Search ................. 210/636, 321.3, 500.29, 210/500.23, 321.69; 422/22, 26, 34

[56] References Cited

U.S. PATENT DOCUMENTS

| | | | |
|---|---|---|---|
| 4,176,070 | 11/1979 | Sakurado et al. | 210/140 X |
| 4,411,866 | 10/1983 | Kahno | 422/26 X |
| 4,609,728 | 9/1986 | Spranger et al. | 210/500.1 X |

FOREIGN PATENT DOCUMENTS 57185  5/1978  Japan ................................. 210/636

*Primary Examiner*—Frank Spear
*Attorney, Agent, or Firm*—Paul C. Flattery; Daniel D. Ryan; Charles R. Mattenson

[57] ABSTRACT

A method of preparing a dialyzer unit having a plurality of coextending hollow fibers includes washing interior fiber surfaces with an acetic acid both, flushing the interior surfaces with an aqueous glycerin solution, and removing the residual water while retaining a substantial quantity of absorbed glycerin in the fibers. The dialyzer can then be sealed and sterilized.

8 Claims, No Drawings

WASHING OF SEMIPERMEABLE MEMBRANE

This application is a continuation-in-part or Ser. No. 554,874 filed Nov. 25, 1983, entitled WASHING OF SEMIPERMEABLE MEMBRANE, now abandoned and a continuation-in-part of Ser. No. 458,107, filed Jan. 14, 1983, entitled RADIATION RESISTANT DIALYZER MEMBRANE (now abandoned).

TECHNICAL FIELD

The invention pertains to methods of preparing dialyzer units formed of cylindrical ultrafiltrating lumens. More particularly, the invention pertains to methods of processing and sterilizing such units without impairing the ultrafiltrating characteristics of the lumens.

BACKGROUND OF THE INVENTION

Hollow, cellulose-type fibers are extensively used on a clinical basis in dialyzers for blood for the maintenance of patients who suffer end stage renal disease. Such dialyzers are also used for acute dialysis of patients for various other reasons. Despite the extensive, and successful use of such dialyzers, certain disadvantages and drawbacks remain.

During the manufacturing process, the fiber is formed as a continuous, hollow filament. The filament has an exterior peripheral surface that can be washed and purified during the manufacturing process. However, due to the continuous nature of the formed filament, the interior surface cannot be purified. Dialyzers are conventionally formed by bundling a plurality of coextending, hyperfiltrating, cellulose lumens or fibers bundled together in a supporting housing.

Prior to being used, such dialyzers are after flushed with selected solutions. One aspect of the flushing step is to minimize the extractables in the fibers before use.

From time to time it has been noted that a certain minor number of patients experience undesirable reactions during or after the dialysis process. These are apparently due to some unknown, extractable component of hollow cellulose-type ultrafiltration fibers, particularly those fibers which are made by the well known cupraammonium process.

Japanese Patent Publication No. 55-23620 of Toray Industries, Inc. entitled "Method for Sterilization of Dialysis Device", discloses a method of saturating the semipermeable membrane of a dialyzer with water, or an aqueous solution of a nontoxic, water-soluble substance such as sodium chloride or glycerin. The undried units are then sealed or packaged and subjected to sterilizing radiation. This is alleged to suppress radiation damage when the membranes are so sterilized.

Rowley et al. U.S. Pat. No. 3,592,672 discloses dry, stabilized rewettable semipermeable cellulose ester and ether membranes formed of sheet material. Rowley also discloses various methods of preparation of the sheet material. The sheet membrane may be washed, while water-wet, with a water miscible organic solvent to extract most of the water from the membrane, followed by contact of the membrane with a nonpolar hydrocarbon solvent, in which the water miscible organic solvent may contain a water soluble polyol such as glycerin. Treatment of such sheet materials is of necessity somewhat different from the treatment of continuous fiber materials. During the manufacturing process, all surfaces of the sheet-type materials are accessible for treatment or processing.

Manos U.S. Pat. No. 4,080,743 discloses a process for drying a water-wet membrane by contacting it with a solution of water miscible and water immiscible solvents and then removing the solution.

Bodner et al. U.S. Pat. No. 4,227,295 discloses a means for manufacture of artificial kidneys out of hollow fiber dialyzers, and provides a general background example of the extensive prior art of hollow fiber dialyzer manufacture.

Lipps U.S. Pat. No. 3,546,209 teaches a process for hydrolyzing cellulose ester fibers, followed by plasticizing the fibers while still wet with a water soluble, nonvolatile plasticizer such as glycerin and then drying the fibers before using them to manufacture a separatory cell. Pages 99 and 100 from a book by Scott, J., entitled *Hollow Fibers: Manufacture and Applications*, Park Ridge, N.J., Noyes Data Corporation (1981) discuss the Lipps patent cited above.

British Pat. No. 1,349,394 entitled "Preswelled Cellulose Films and Process Therefor" discloses methods of manufacturing sheet-type cellulose dialysis films. Among other steps, the British document discloses the known use of glycerin in the process of manufacturing the cellulose membrane.

It is thus desirable to process such dialyzer units so as to remove larger amounts of undesired extractable elements from the fibers, and then to reconstitute the fibers with their desired flexibility and softness. It is also desirable to provide enhanced protection to the hollow fibers against radiation damage which can take place in the event that the dialyser unit is radiation sterilized.

SUMMARY OF THE INVENTION

In accordance with the invention, a method is provided for preparing a dialyzer unit with a plurality of coextensively oriented, hollow, fluid conducting lumens. The lumens are preferably formed of cuprammonium, cellulose-type fibers.

The method includes purifying interior surfaces of the lumens by washing same with a selected acid mixture. Preferred washing mixtures include solutions of acetic acid and water. The washing step removes any impurities, such as copper, that are likely subsequently to cause patient reactions. In addition, during the washing step, the fibers expand and stretch with a related increase in the over-all porosity thereof.

Subsequently, the acid mix is flushed from the interior surfaces using a selected glycerin solution. Simultaneously with the flushing, substantial quantities of glycerin are absorbed into the expanded porous spaces of the fibers. The absorbed glycerin maintains the fibers in a stable, expanded condition. The flushing solution is then removed from the lumens leaving only the absorbed glycerin.

The dry dialyzer unit can then be sealed. The glycerin filled lumens can be sterilized by radiation without any substantial reduction in the ultrafiltration characteristics thereof. Alternately, ethylene oxide sterilization can be used.

In accordance with the invention, an aqueous solution of water and glycerin can be used during the flush sequence. This solution preferably contains glycerin in a range of 30–50% by volume. The quantity of glycerin absorbed by the fibers corresponds to about 30% by weight. The water can then be evaporated using heated air circulated through the lumens leaving only the absorbed glycerin.

Alternately, a solution of alcohol and glycerin can be used for the flush cycle. Preferably the percent, by volume, of glycerin will approach 50%. While alcohol is readily removed from the fibers at the end of the flush cycle without any need for heating the fibers, it does have the disadvantage that it must be used in a sealed, explosion-proof system.

DESCRIPTION OF THE INVENTION

In accordance with the invention, methods are provided for processing a bundle of hollow, cellulose-type fibers for use as a diffusion device for contact with blood.

It is generally preferred that the cellulose-type fiber to be of the cupraammonium type. For example, Cuprophan, a brand of hollow fiber material sold by Enka A.G. of West Germany is a suitable fiber.

In an initial purifying step, an aqueous acid solution, preferably of pH 1 to 5 and typically pH 2 to 4, is passed through the bores or lumens of the hollow fibers to remove extractable elements therefrom.

One then passes through the bores a solution of a water-miscible organic polyol liquid having a molecular weight of no more than 200. A volatile nonreactive solvent may be used. Alternately, instead of a solvent, water can be used. Following this, the solvent or water is eliminated from the bundle leaving only the absorbed polyol liquid.

By the treatement of this invention, leachable elements of the fibers are removed particularly in the acid wash step. One prominent leachable element so removable is a large percentage of the copper which is used in the manufacture of the cellulose hollow fibers in the cupraammonium process. In addition, the water causes the fibers to expand and stretch thereby increasing their porosity.

It is generally preferred for the aqueous acid solution to be an acetic acid solution. This has the advantage of being volatile for complete removal and usable in stainless steel processing equipment with less corrosion for easy practice of the process of this invention. Other acid solutions which may be used include typically volatilizable acids having nontoxic residues such as lactic acid, citric acid, dilute hydrochloric acid, or acidic organic chelating agents such as glycine or EDTA.

The organic polyol is preferably glycerin, but may also be ethylene glycol, propylene glycol, diethylene glycol, or higher glycols and similar materials which are water miscible and thus capable of absorpton as a plasticizer into the membrane material.

The volatile, nonreactive solvent is most conveniently an alcohol such as isopropanol, although ethanol, for example, may be used, as well as other solvents if desired. Typically, from 20 to 50 volume percent of the organic polyol may be present in 80 to 50 volume percent of the volatile nonreactive solvent. Preferably from 25 to 50 percent of glycerin or other polyol is present, with the balance being the volatile solvent.

The volatile, nonreactive solvent may also be a volatile chlorofluorocarbon rather than an alcohol, for example one of the solvents sold under the trademark FREON by DuPont, specially a trichlorotrifluoroethane, e.g., 1,1,2-trichloro-1,2,2,-trifluoroethane. Likewise, mixtures of an alcohol with the above may be used.

Alternately, an aqueous flushing solution containing glycerin in a range of 20-50% by volume with the balance being water can be used. With the above noted solution, it has been determined that the fiber will absorb and retain glycerine in a range of 25-35%, by weight. Preferably, 30% by weight of glycerine will be retained. All residual water can then be removed by evaporation leaving only the absorbed glycerin in the fibers.

The unit can then be sealed as is conventional and sterilized. Sterilizing radiation can be used. Alternately, ethylene oxide gas sterilization can be used since the water has been evaporated. It has been observed that significantly less degradation occurs, if radiation sterilization is used, in the ultrafiltration and other properties of the fiber due to the pesence of the high level of absorbed polyol material.

The sterilized dialysis units, still containing the absorbed glycerin, but without any residual water, can be stored or shipped. The absence of residual water will reduce shipping costs. Further, potential freezing problems are eliminated. Finally, the retained, absorbed glycerin will maintain the fiber in its preferred, expanded condition for substantial periods of time.

In accordance with conventional methods of making hollow fiber dialyzers, the bundles of hollow fibers, prior to being treated with the aqueous acid solution, may be secured in a tubular housing and potted at both ends, with the bores being opened after said potting.

The acid solution, and then the solvent dispersion of polyol, can be passed through the bores of the bundle by pumping the respective solutions from one end to the other of the bores of the hollow fibers. As the polyol solution passes through the bores of hollow fibers, as discussed above, a protective film of polyol is absorbed by the material of the hollow fibers. It may also be desirable to wash the exteriors of the hollow fibers as they are received from the manufacturer, as well as the bores thereof in accordance with this invention.

The process of this invention is advantageous over prior processes in that it can be considerably less expensive than other hollow fiber treatment processes, particularly those using Freon-type solvents. Further, the use of aqueous glycerin solutions to carry out the flush cycle eliminates any need for sealed, explosion-proof systems.

In addition, the alcohol-glycerin solvent of this invention is applied to wet, water-washed bundles rather than to the typically dry bundles of hollow fibers as in the prior application. Accordingly, since residual water in the bundles tends to dilute out the solvent, and since the glycerin of the solvent replaces absorbed water and the like in the bundle, a higher glycerin concentration is typically used in this invention.

The invention of this application is not only applicable with advantage to bundles of hollow fibers which are radiation sterilized, providing protection against radiation damage, but it may also be used with bundles of hollow fibers to be sterilized by other processes. For example, ethylene oxide sterilization may be used to take advantage of the favorable economics of the process of this invention. Ethylene oxide sterilization may be used even where the aqueous glycerin flush solution is used because all the residual water is evaporated off the fibers.

By way of specific example, hollow fiber dialyzers of known design (CF 15.11 dialyzers sold by Travenol Laboratories, Inc. of Deerfield, Ill.) were initially treated by passing 400 ml. of dilute acetic acid (5 to 10 percent by volume glacial acetic acid in water) through each dialyzer blood path. Following this, 400 ml. of either 30 volume percent or 50 volume percent glycerin dissolved in isopropyl alcohol were passed through the blood path of the dialyzers, to remove water from the system and to deposit glycerin into the hollow fibers. Following this, the dialyzers were air dried by blowing warm air through the blook paths.

The resulting dialyzers exhibited greatly reduced copper-containing leachables upon subsequent leaching experiments. Also, they exhibited ultrafiltrations after sterilization by gamma radiation which were not inferior to corresponding dialyzers sterilized with ethylene oxide.

Corresponding dialyzers which were not treated in the above manner exhibited a significant loss of ultrafiltration capacity after sterilization of gamma radiation, when compared with the above.

As a further example, dialysis units have been processed in accordance with each of the following exemplary methods. After completion of processing the dry units, containing 30% by weight of absorbed glycerin were then sterilized by radiation. Due to the substantial quantities of absorbed glycerin, no reduction of ultrafiltration charactertistics was observed after sterilization.

Aqueous Wash Processing (1) Wash dialyzer with 100 to 300 ml per minute for 1.5 minutes to 3.0 minutes with 7.5% acetic acid in distilled water by volume. (Range 5.0 to 10% by volume).

(2) Flush filtered air at 10 PSI for 30 second through the dialyzer (this removes the step 1 fluid from the inside of the fiber).

Aqueous Solution Flush (3) The dialyzer is flushed with 100 to 300 ml per minute with 30-50% glycerin in water for 1.5 minutes to 3.0 minutes by volume.

(4) The dialyzer is dried for 15 minutes at 10 PSI at 22 ft$^3$ per minute using filter processed air between 20 and 40° C.

Alternate Isopropanol Alcohol Solution Flush (3) The dialyzer is flushed with 100 to 300 ml per minute with 30-45% glycerin in isopropanol alcohol (IPA).

(4) Flush filtered air at 10 PSI for 30 seconds through the dialyzer. (Range 5-15 PSI).

(5) The dialyzer is dried for 10 minutes at 8 PSI at 20 ft$^3$ per minute using filter processed air between 20 and 40° C.

After the drying step, the dry, glycerin absorbed dialyzer unit can be sealed as is conventional and sterilized.

The above has been offered for illustrative purposes only, and is not intended to limit the scope of the invention of this application, which is as defined in the claims below.

What is claimed is:

1. A method of preparing a dialyzer unit that has a plurality of coextensively oriented, hollow, fluid conducting, porous, ultrafiltrating lumens, the method including:
    washing interior surfaces of the lumens with a selected mixture of acid and water so as to remove impurities therefrom as well as to substantially enlarge and expand the physical dimensions of the porous structure of each lumen;
    flushing the acid mix from the interior surfaces using a selected organic polyol solution while simultaneously providing for absorption of substantial quantities thereof by each lumen so as to retain the expanded physical dimensions thereof;
    removing the flushing solution leaving only the absorbed polyol in the lumens; and
    sterilizing the polyol filled lumens without any substantial reduction in the ultrafiltrating characteristics thereof.

2. The method in accordance with claim 1 in which said organic polyol is glycerin.

3. The method in accordance with claim 2 wherein: the flushed lumens absorb approximately 30% by weight of glycerin.

4. The method in accordance with claim 3 wherein the glycerin flush solution includes glycerin in a range of 25%–50% by volume.

5. The method in accordance with claim 4 wherein the glycerin corresponds to at least 25% by volume of the glycerin flush solution.

6. The method in accordance with claim 4 wherein the solution preferably contains 50% glycerin by volume.

7. The method in accordance with claim 4 wherein the glycerin flush solution includes a selected nonreactive solvent.

8. The method in accordance with claim 7 wherein the solvent corresponds to a selected alcohol.

* * * * *